United States Patent

Wild

[15] 3,678,212

[45] July 18, 1972

[54] PLANAR DRIVE ADAPTER FOR CASSETTE TAPE RECORDER

[72] Inventor: Albert F. Wild, Rochester, N.Y. 14610

[73] Assignee: Tapecon, Inc., Rochester, N.Y.

[22] Filed: April 22, 1970

[21] Appl. No.: 30,653

[52] U.S. Cl. ............179/100.2 Z, 179/100.1 A, 179/100.11, 179/100.2 MD

[51] Int. Cl. ......................................G11b 5/80, G11b 25/04

[58] Field of Search ...............179/100.2 Z, 100.1 A, 100.11; 274/4 G

[56] References Cited

UNITED STATES PATENTS 3,531,127 9/1970 Harper..................................274/4 G 2,603,006 7/1952 MacChesney et al. ......179/100.2 MD 2,677,200 5/1954 MacChesney...............179/100.2 MD 2,468,198 4/1949 Heller..........................179/100.2 MD

*Primary Examiner*—Bernard Konick

*Assistant Examiner*—Robert S. Tupper

*Attorney*—Cumpston, Shaw & Stephens

[57] ABSTRACT

A planar drive adapter converts a cassette tape recorder for playing flat cards having magnetic strips. The adapter housing fits into the cassette slot of the recorder and the adapter carries its own magnetic head and card drive wheel, but uses the electronic circuitry and drive power of the recorder.

27 Claims, 10 Drawing Figures

INVENTOR.
ALBERT F. WILD

BY Cumpston, Shaw and Stephens

ATTORNEYS

INVENTOR.
ALBERT F. WILD
BY Crumpston, Shaw and Stephens
ATTORNEYS

INVENTOR.
ALBERT F. WILD
BY Campbell, Shaw and Stephens
ATTORNEYS

INVENTOR.
ALBERT F. WILD
BY Crompton, Shaw and Stephens
ATTORNEYS

PLANAR DRIVE ADAPTER FOR CASSETTE TAPE RECORDER

THE INVENTIVE IMPROVEMENT

Magnetic recording equipment for flat cards is generally old. Such equipment in the past has been specially built solely for playing flat cards with magnetic strips, and this equipment has been expensive, cumbersome, and of relatively poor quality. On the other hand, simple cassette tape recorders are now mass produced economically and are widely available in the market.

The invention involves recognition of the advantages of an adapter for converting such cassette recorders to planar drive for flat cards having magnetic strips. The adapter uses many components of the tape recorder and leaves the recorder available for conventional use with cassettes. Such an arrangement is much simpler and more economical than prior art recording equipment especially made for planar drive. The invention also includes specific structural suggestions for such an adapter and aims at simplicity, reliability, versatility, and economy.

SUMMARY OF THE INVENTION

The inventive adapter converts a cassette drive tape recorder to planar drive and includes a housing having an under side configured to fit into the cassette slot of the recorder. The housing has an opening to receive the capstan of the recorder and a surface for supporting the edge of a planar recording element for movement along a path. Drive wheel means in the housing engages the capstan and extends over the supporting surface adjacent the path to engage and advance the planar element. A magnetic head in the housing adjacent the path engages the planar element, and electrical means connects the magnetic head to the circuitry of the recorder.

DRAWINGS

DETAILED DESCRIPTION

Figure 1:
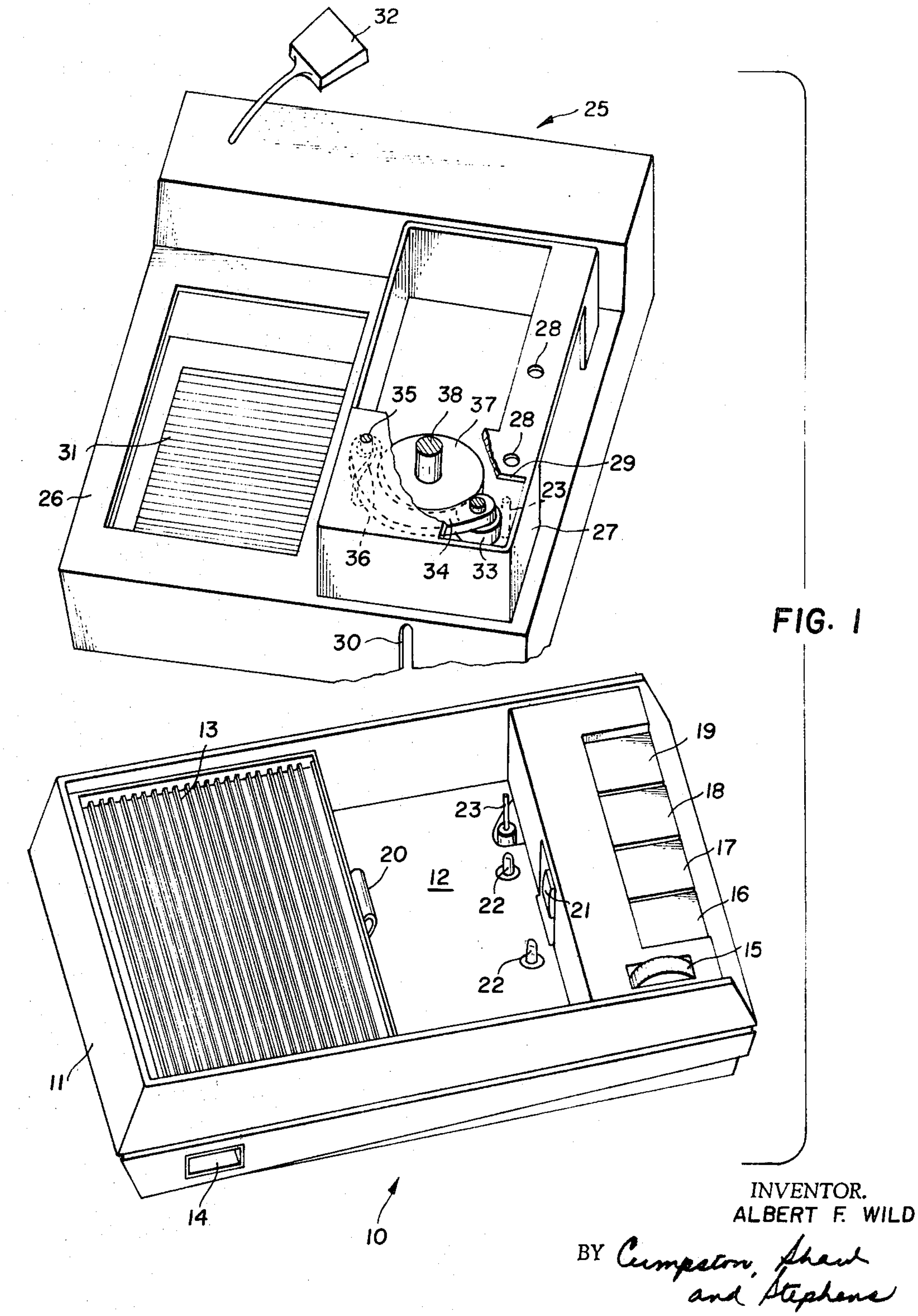
FIG. 1 is a partially cut-away perspective view of a preferred embodiment of the inventive adapter and a generally known tape recorder in 180° separation showing the underside of the adapter and the upper side of the recorder.

FIGS. 1 – 4 show a generally known cassette tape recorder 10 that is converted by the inventive adapter to planar drive. Recorder 10 has a body 11 having a recess 12 forming a cassette slot for receiving a standard tape recorder cassette. Recorder 10 includes record or play head 21, electronic circuitry 49, a microphone 88, and a speaker 50 arranged under grill 13. A jack receptacle 14 connects with the circuitry 49, and the controls for recorder 10 include volume control 15, record switch 16, rewind switch 17, playback switch 18, and stop switch 19. A bias spring 20 in cassette slot 12 biases a cassette toward the recorder's magnetic head 21. Locating pins

22 register a cassette in place in slot 12, and a capstan 23 extends into slot 12 for driving tape in a cassette.

The under side of one preferred embodiment of the inventive adapter 25 is shown in inverted position in FIG. 1 so that it can be turned over 180° and fitted over recorder 10. Adapter 25 has a housing 26 with a cassette-shaped body 27 extending downward from the under side of housing 26 to fit into cassette slot 12. The perimeter of extension 27 has a conventional cassette shape for snap-fitting into cassette slot 21, and extension 27 includes holes 28 registering with locating pins 22 and a bottom opening 29 receiving capstan 23.

Adapter housing 26 also includes a transverse slot 30 for receiving a flat card for movement along a path across adapter 25. A grill 31 on adapter 25 registers with grill 13 of recorder 10 so that speaker 50 in recorder 10 can sound through adapter 25, and a jack connecter 32 plugs into jack receptacle 14 which is arranged for electrically connecting adapter 25 and recorder 10.

Figures 2, 3:
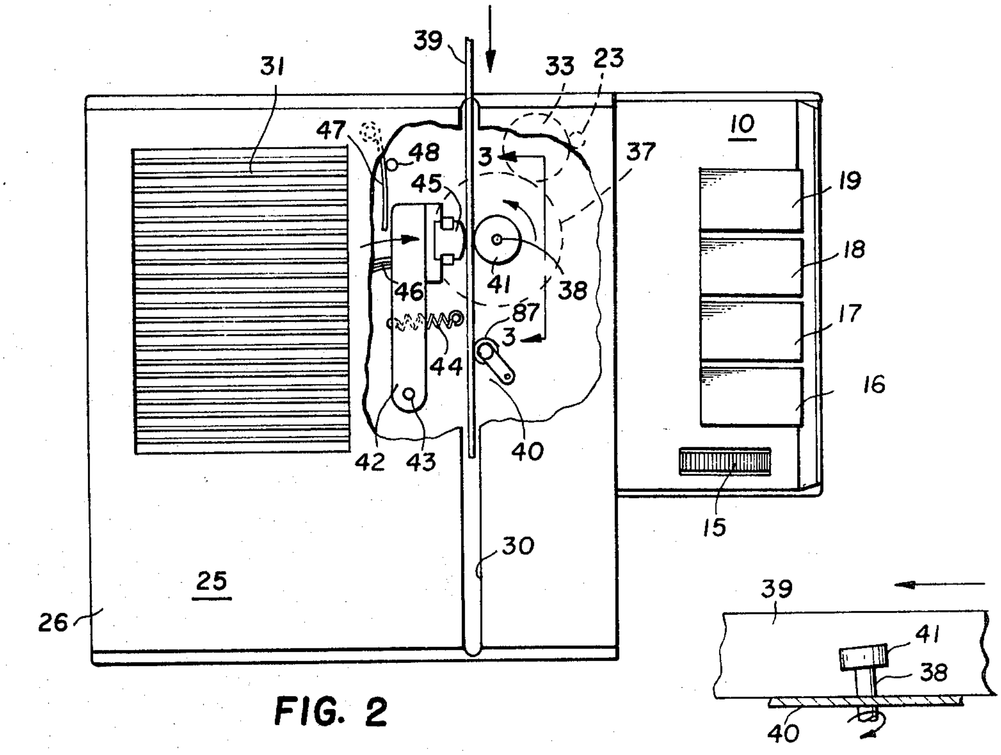
FIG. 2 is a partially cut-away plan view of the adapter and recorder of FIG. 1 fitted together.
FIG. 3 is a partially sectioned fragment of the adapter of FIG. 2, taken along the line 3 — 3 thereof.

Adapter 25 is shown attached to recorder 10 in FIG. 2, and adapter 25 overlies and encloses a substantial portion of recorder 10. Adapter 25 can be permanently secured to recorder 10 or can be detachable, depending upon whether recorder 10 will be used for regular cassette play in addition to planar drive. Also, adapter 25 can completely overlie and enclose recorder 10, and under such circumstances, push buttons preferably are arranged to operate switches 16–19 of recorder 10.

As best shown in FIG. 1, capstan 23 extends up into extension 27 and engages wheel 33 which is rotatably carried on arm 34 that pivots on shaft 35 and is biased by spring 36 to urge wheel 33 against capstan 23. Wheel 33 also engages a larger wheel 37 carried on rotatable shaft 38 so that the rotation of capstan 23 is transferred through wheel 33 to wheel 37.

As best shown in FIG. 2, a plate 40 in housing 26 extends over drive wheels 33 and 37 and forms a support surface extending the length of slot 30 to support the edge of a generally planar recording element 39 in the form of a flat card carrying a strip of magnetic recording material. Card 39 can have many shapes and sizes and can be used for many purposes. A few examples are, punched cards, greeting cards, plain or embossed message cards or photographs. In addition to one or more strips of magnetic material for recording, card 39 can also carry visual or tactile or machine readable information. The lower edge of card 39 rests against support plate 40 with card 39 in generally upright position for travel along slot 30.

Shaft 38 turned by wheel 37 extends through plate 40 to the upper side of plate 40 adjacent the path followed by card 39 in slot 30. Shaft 38 carries a drive wheel 41 that engages card 39 to advance card 39 along slot 30. Drive wheel 41 is preferably smaller than drive wheel 37 as illustrated to effect a speed reduction. Capstan 23 is driven to advance a cassette tape at a reasonable speed for cassette recording, but it is desirable to advance planar card 39 at a slower speed to make optimum use of a relatively short length of magnetic recording material for a message.

An arm 42 is pivoted on a shaft 43 above plate 40 and biased by a spring 44 for clockwise movement toward card 39 as shown by the arrow. Arm 42 carries a magnetic head 45 that is pressed against card 39 by spring 44 to track a magnetic strip on card 39 as card 39 advances through slot 30. An electric conductor 46 connects magnetic head 45 to recorder 10 through jack 32 and receptacle 14, as explained more fully below.

Magnetic head 45 and drive wheel 41 are arranged directly opposite each other and touch each other when no card 39 separates them. This affords a simple and reliable driving and tracking arrangement wherein a single spring 44 not only biases magnetic head 45 against card 39, but biases card 39 against drive wheel 41 for movement along slot 30. A little extra bias of head 45 against an unusually thick card 39 is desired and this is provided by cantilever spring 47 positioned by locating pin 48 to be just out of engagement with arm 42 when a relatively thin card 39 separates head 45 from drive wheel 41. A relatively thicker card 39 moves arm 42 further counter clockwise into engagement with spring 47 which provides additional bias for head 45 against such a thick card.

The sidewalls of slot 30 are spaced above plate 40 to keep card 39 from tilting very far from the vertical as it passes through slot 30 and to guide card 39 into the nip between drive wheel 41 and head 45. For many applications, drive wheel 41 and magnetic head 45 adequately support card 39 without support from the walls of slot 30, but these are preferred for closing over the working components of the adapter and helping keep cards 39 upright and on course. A schematically illustrated ink wheel 87 is pivotally supported above plate 40 for engaging card 39 to make an ink mark along card 39 as it advances through slot 30. Such a mark can visually indicate that a magnetic strip on card 39 has been recorded. Also, other marking arrangements for other purposes can be used within the spirit of the invention.

Figure 4:
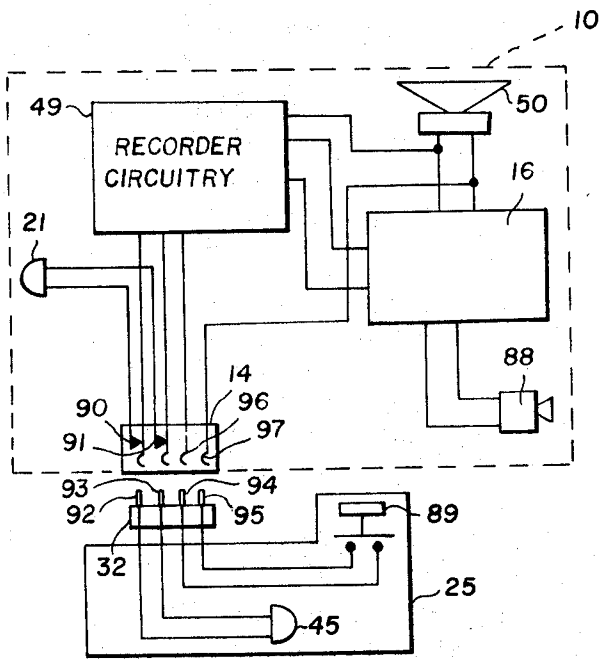
FIG. 4 is a schematic representation of a preferred electrical connection between the inventive adapter and a cassette recorder.

FIG. 4 shows a schematic preferred electrical relationship between adapter 25 and recorder 10. Electronic circuitry 49 of recorder 10 is normally connected to recorder speaker 50 and microphone 88 through switch 16 as schematically illustrated. Switch 16 is preferably a multiple-contact switch that disconnects speaker 50 from recorder circuitry 49 when the recorder is in the record mode. Adapter 25 is connected to recorder 10 through jack 32 and receptacle 14. With jack 32 removed from receptacle 14 as illustrated, the magnetic head 21 of recorder 10 is normally connected to recorder circuitry 49 through contacts 90 and 91. Jack terminals 92 and 93 respectively open contacts 90 and 91 when jack 32 is inserted in receptacle 14, and terminals 92 and 93 are connected to magnetic head 45 of adapter 25. Hence, plugging jack 32 into receptacle 14 disconnects magnetic head 21 from recorder circuitry 49 and substitutes magnetic head 45 of adapter 25 in electrical connection with recorder circuitry 49.

One of the inventive discoveries in working with planar drive adapters is an advantage obtainable in briefly connecting speaker 50 with recorder circuitry 49 when recorder 10 is in the record mode under actuation of switch 16. This is preferably effected by switch 89 in adapter 25 closing a normally open circuit through terminals 94 and 95 of jack 32 and contacts 96 and 97 of receptacle 14 to by-pass switch 16 and connect speaker 50 to recorder circuitry 49. Actuation of switch 89 when recorder 10 is in the record mode produces an audible feedback "beep" sounded in speaker 50 and picked up by microphone 88 for recording through magnetic head 45 in adapter 25. This would be undesirable in an ordinary cassette recorder, but has a useful function in the planar drive adapter. In multi-channel cards intended for question-and-answer or multiple message, and inherently rather limited in the length of time for recording messages, such a beep signal can be used to signal the end of a message. This prevents waste in the available message space. To use this, a person recording a message merely states his message, and then presses the push-button switch 89 to record an audible beep as soon as he is finished. The message receiver then plays back the message until he hears the beep signal which signifies the message end. He can stop at that point without wasting any available message space and begin to record his reply.

Shaft 38 and drive wheel 41 are preferably angled slightly from the vertical as exaggerated in FIG. 3 so that wheel 41 tends to drive card 39 downward to keep its edge pressed against plate 40 as card 39 is advanced in the direction of the arrow. This ensures that card 39 tracks accurately against surface 40 to keep the magnetic track on card 39 registered with magnetic head 45.

Figure 5:
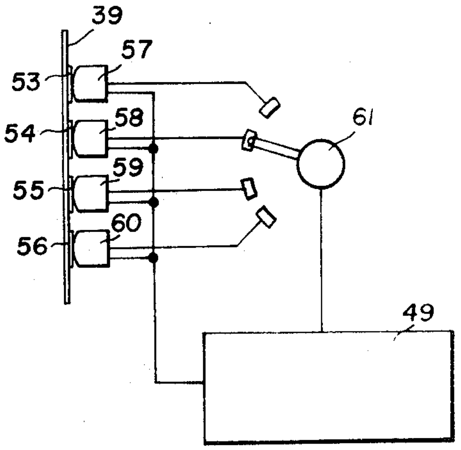
FIG. 5 is a schematic representation of a multitrack version of the inventive adapter.
Figure 6:
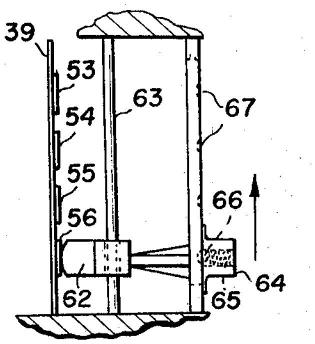
FIGS. 6 and 7 are partially schematic preferred embodiments of multi-track versions of the inventive adapter.
Figure 7:
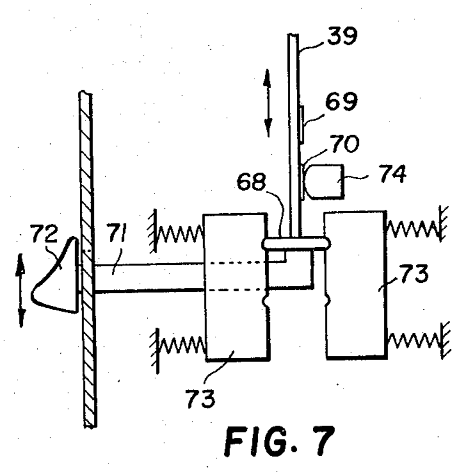

FIGS. 5 – 7 show various ways for achieving multi-track operation in the inventive adapter.

Card 39 of FIG. 5 has four magnetic strips 53 – 56 exaggerated in size and thickness to make them visible. Four magnetic heads 57 – 60 are positioned to register respectively with tracks 53 – 56. An electrical switch 61 on the adapter is arranged for selectively connecting one of the magnetic heads 57 – 60 with recorder circuitry 49 so that any one of the four tracks 53 – 56 can be used as desired. A similar arrangement is possible with magnetic heads 57 – 60 integrated into one large unit tracking four channels of a single magnetic strip.

The four tracks 53 – 56 on card 39 in FIG. 6 are selectively tracked by a single magnetic head 62 that is mechanically movable to register with each of the tracks as desired. This is accomplished by a guide rod 63 supporting magnetic head 62 and a handle 64 for moving magnetic head 62 vertically on guide rod 63. A spring 65 urges a detent ball 66 into detent recesses 67 for accurate registration of head 62 with each of the tracks 53 – 56.

Multi-track operation can also be accomplished as shown in FIG. 7 by mechanically moving guide 68 supporting and engaging the edge of a card 39 carrying two magnetic tracks 69 and 70. Guide 68 is moved by rod 71 and handle 72 and is snapped into correct operating positions between detend blocks 73. A fixed magnetic head 74 engages the desired track 69 or 70 depending upon the position of guide surface 68.

Figure 8:
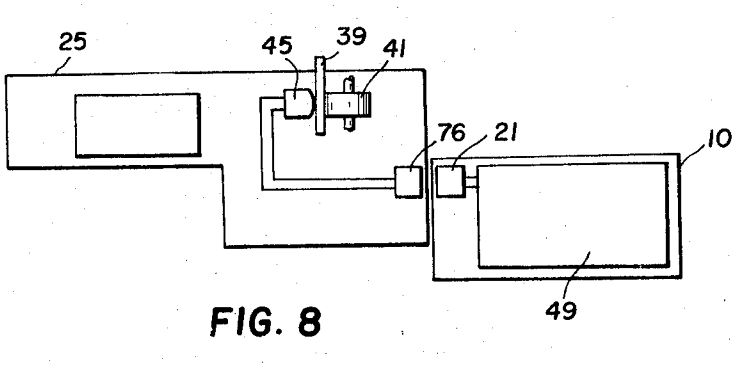
FIG. 8 is a schematic illustration of another preferred electrical connection between the inventive adapter and the circuitry of a tape recorder.

FIG. 8 schematically shows an alternative electrical connection between adapter 25 and recorder 10. Instead of connecting magnetic head 45 of adapter 25 to circuitry 49 in recorder 10 through an electrical conductor and a jack as previously described, a signal path between adapter 25 and recorder 10 can be established through the normal magnetic head 21 of recorder 10. This is preferably accomplished without additional amplification by connecting magnetic head 45 to a transducer 76 arranged adjacent magnetic head 21 of recorder 10. Playback signals produced by magnetic head of recorder 10. Playback signals produced by magnetic head 45 are fed to transducer 76 to pass through magnetic head 21 and into recorder circuitry 49 for operation of recorder 10. Similarly record signals from circuitry 49 are fed through the signal path between magnetic head 21 and transducer 76 and are applied to magnetic head 45. If amplification of playback signals from head 45 is desired, powered circuitry for such purpose can be added to adapter 25.

Figure 9:
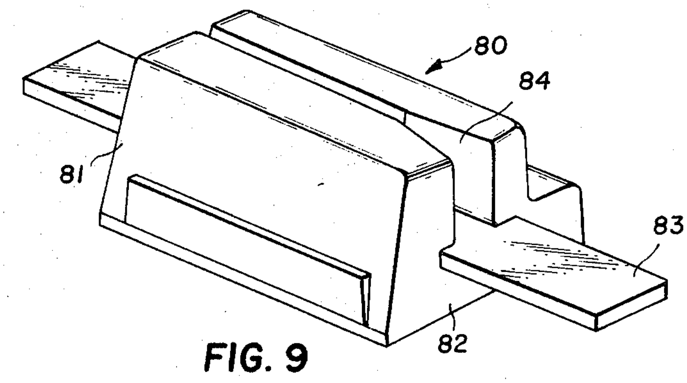
FIG. 9 is a perspective view of another preferred embodiment of the inventive adapter.
Figure 10:
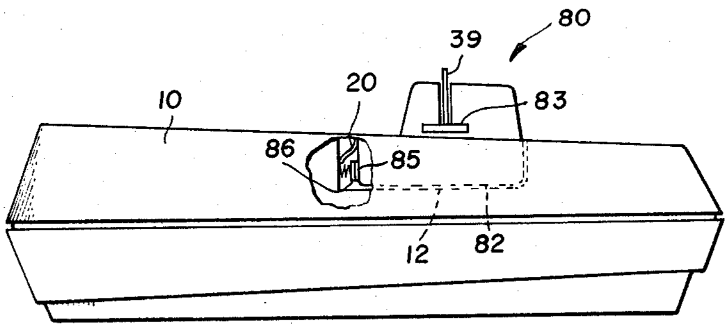
FIG. 10 is a partially cut-away elevational view of the adapter of FIG. 9 connected to a cassette recorder.

A smaller planar drive adapter 80 is shown in FIGS. 9 and 10 for more convenient snapping into and out of recorder 10. Adapter 80 is preferred where recorder 10 will be used in the conventional way as well as for planar drive. The lower perimeter 82 of housing 81 of adapter 80 is generally cassette-shaped for snapping in and out of slot 12. The same location holes 28 and opening 29 to receive capstan 23 are formed in the bottom of housing 81 as previously described. Similar drive wheel means, magnetic head and other components are arranged inside adapter 80 for function in a similar way to adapter 25. The differences are that adapter 80 is much smaller, has a different electrical connection to recorder 10, and a different-shaped slot and support surface for a card 39.

A support plate 83 extends transversely of adapter 80 to engage and support the edge of a card 39 passing through vertical slot 84 in adapter 80. A card 39 is driven through slot 84 in engagement with support surface 83 for recording and playback as previously described.

Recorder 10 is modified to have spring biased contacts 86 at the back edge of cassette slot 12, and adapter 80 has contacts 85 at its back edge positioned to register with contacts 86. Contacts 85 and 86 engage as adapter 80 is snapped into cassette slot 12 so that the magnetic head in adapter 80 is connected to the circuitry of recorder 10 in a similar manner to the jack connection of adapter 25.

As can be seen by comparing adapter 80 with adapter 25, a wide range of sizes and shapes of adapters are possible within the spirit of the invention. Also, those skilled in the art will understand many variations possible on this general adapter concept suggested by the invention.

In operation, recorder 10 is started up by switching on its controls, and the leading edge of card 39 is inserted into slot 30 or 84 so that a magnetic strip on card 39 faces and engages magnetic head 45. Capstan 23 is turning drive wheel 33 which rotates wheel 37. This turns shaft 38 and drive wheel 41 against magnetic head 45 so that when the leading edge of card 39 enters the nip between wheel 41 and head 45 it is gripped and advanced by wheel 41 with magnetic head 45 pressing against and tracking a magnetic track on card 39. Card 39 proceeds in the direction of the arrow through slot 30 or 84 with magnetic head 45 operated to record a brief message on card 39 or to play back a message previously recorded. The signals to and from magnetic head 45 are carried through jack 32 and receptacle 14 to the electronic circuitry 49 of recorder 10 to actuate its speaker 50 for playback and its microphone 88 for recording.

Adapter 25 or 80 can be detachable from recorder 10 so that recorder 10 can be used in the usual way, or the adapter can be permanently attached to and even completely enclose recorder 10. Push buttons in the adapter can engage the switches of recorder 10 for controlling these switches from the adapter. Many variations in adapter sizes, shapes, and relationships to various tape recorders will be known to those skilled in the art once the general principle of the inventive adapter is known.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spriit of the invention. For example, different electrical connections, multi-channel selection, and card-drive arrangements are possible within the spirit of the invention, and those skilled in the art will know how to adapt the inventive principles to many different specific recorders and circumstances.

I claim:

1. An adapter for a cassette-drive tape recorder having a cassette slot, a speaker, a microphone, a magnetic head, and amplifier means for amplifying input from said microphone for application to said magnetic head for recording and for amplifying input from said magnetic head for application to said speaker for playing back, said adapter converting said cassette-drive tape recorder to planar drive and comprising:

a. a housing;

b. the underside of said housing being configured to fit into said cassette slot;

c. said housing having means for supporting a generally planar recording element for movement along a path outside of said cassette slot;

d. said underside of said housing having an opening arranged to receive the capstan of said recorder;

e. drive wheel means in said housing arranged to engage said capstan and to engage and advance said planar element at a speed substantially slower than the surface speed of said capstan;

f. a magnetic head in said housing arranged adjacent said path to engage said planar element; and g. electrical means for connecting said magnetic head to the circuitry of said recorder so as to use said microphone and said amplifier means to record on said planar element and to use said amplifier means and said speaker to play back from said planar element.

2. The adapter of claim 1 wherein said electric connecting means comprises separable connections between said adapter and said recorder.

3. The adapter of claim 2 wherein the recorder portions of said connections are arranged on said recorder adjacent said cassette slot so that said connections are made when said adapter is seated in said cassette slot.

4. The adapter of claim 3 wherein said separable connections comprise spring biased contacts.

5. The adapter of claim 2 wherein said separable connections are arranged to disconnect the magnetic head of said recorder from said recorder circuitry when said magnetic head of said adapter is connected to said circuitry.

6. The adapter of claim 1 wherein said element supporting means comprises a surface for supporting the edge of said element, and said drive wheel means extends above said surface to engage said planar element.

7. The adapter of claim 6 wherein said drive wheel means includes a wheel engaging said planar element and angled slightly relative to said supporting surface to urge said planar element against said supporting surface during said advancement.

8. The adapter of claim 1 wherein said electric connecting means comprises a transducer in circuit with said magnetic head in said adapter and arranged adjacent the magnetic head of said recorder to form a signal path through said transducer and said recorder head.

9. The adapter of claim 1 wherein said drive wheel means includes means for biasing a wheel against said capstan.

10. The adapter of claim 1 wherein said drive wheel means includes a relatively large diameter wheel driven at the surface speed of said capstan and a relatively small diameter wheel turning with said large diameter wheel and engaging said planar element.

11. The adapter of claim 10 including a surface for supporting the edge of said planar element and wherein said large diameter wheel is below said supporting surface in said cassette slot and said small diameter wheel is above said supporting surface.

12. The adapter of claim 1 wherein said drive wheel means engages said planar element opposite said magnetic head.

13. The adapter of claim 12 including means for urging said magnetic head and said drive wheel means together against opposite sides of said planer element.

14. The adapter of claim 1 wherein a pivotal arm supports said magnetic head, and a spring biases said head against said planar element.

15. The adapter of claim 1 wherein said housing is configured to form an open slot for said planar element.

16. The adapter of claim 1 wherein said housing is configured to snap into and out of said cassette slot like a cassette.

17. The adapter of claim 1 wherein said electric connecting means comprises separable connections between said adapter and components of said recorder, and said adapter includes a switch for closing a normally open circuit through said connections for connecting the speaker of said recorder to said recorder circuitry when said recorder is in the record mode to produce an audible beep signal.

18. The adapter of claim 1 including a plurality of said magnetic heads, and means for selectively connecting said magnetic heads electrically with said recorder circuitry.

19. The adapter of claim 1 including means for tracking a plurality of magnetic tracks on said planar element.

20. The adapter of claim 19 including a plurality of said magnetic heads respectively registered with said tracks, and means for selectively connecting said magnetic heads electrically with said recorder circuitry.

21. The adapter of claim 19 including mechanical means for moving said magnetic head selectively into registry with said tracks.

22. The adapter of claim 19 including mechanical means for moving said planar element selectively to register said tracks with said magnetic head.

23. The adapter of claim 1 including means for inking said planar element as it advances along said path.

24. The adapter of claim 1 wherein said element-supporting means is a surface for supporting the edge of said element, said drive wheel means extends above said surface to engage said planar element, said housing is configured to form an open slot above said support surface, and said drive wheel means includes a wheel engaging said planar element and angled slightly relative to said supporting surface to urge said planar element against said supporting surface during said advancement.

25. The adapter of claim 24 wherein said drive wheel means includes means for biasing a relatively large diameter wheel against said capstan, and said element-engaging wheel has a relatively smaller diameter and turns with said large diameter wheel.

26. The adapter of claim 25 wherein said magnetic head engages said planar element opposite said element-engaging wheel, and a spring biases said head against said planar element.

27. The adapter of claim 1 wherein a pivotal arm supports said magnetic head, a first spring biases said head against said planar element, said drive wheel means engages said planar element directly opposite said head, and a second spring engages said pivotal arm for additionally biasing said head against said planar element whenever said planar element exceeds a pre-determined thickness.

* * * * *